United States Patent
Davidson et al.

(10) Patent No.: US 10,647,399 B2
(45) Date of Patent: May 12, 2020

(54) ELECTRIC ACTUATOR FOR A MARINE VESSEL

(71) Applicant: MARINE CANADA ACQUISITION INC., Richmond OT (CA)

(72) Inventors: Noam Dean Davidson, Vancouver (CA); Richard Tyler Redfern, Chemainus (CA); Edmond Adeeb Elia Astafanus, Surrey (CA); Eric B. Fetchko, Burnaby (CA); Mark Isaac Dyck, Delta (CA)

(73) Assignee: Marine Canada Acquisition Inc., Richmond (CA)

( * ) Notice: Subject to any disclaimer, the term of this patent is extended or adjusted under 35 U.S.C. 154(b) by 146 days.

(21) Appl. No.: 15/978,772

(22) Filed: May 14, 2018

(65) Prior Publication Data

US 2019/0344868 A1    Nov. 14, 2019

(51) Int. Cl.
*B63H 20/12*  (2006.01)
*B63H 20/00*  (2006.01)

(52) U.S. Cl.
CPC ....... *B63H 20/12* (2013.01); *B63H 2020/003* (2013.01)

(58) Field of Classification Search
CPC .......................... B63H 20/12; B63H 2020/003
See application file for complete search history.

(56) References Cited

U.S. PATENT DOCUMENTS

| 2005/0170712 A1* | 8/2005 | Okuyama | B63H 20/12 440/59 |
| 2013/0292201 A1* | 11/2013 | Yamanaka | B23P 19/04 180/402 |
| 2015/0108823 A1* | 4/2015 | Figuered | B60K 7/0007 301/6.4 |
| 2017/0106959 A1* | 4/2017 | Davidson | F16H 25/2252 |

FOREIGN PATENT DOCUMENTS

| WO | WO2010013867 A1 | 2/2010 |
| WO | WO2013123208 A1 | 8/2013 |
| WO | WO2016004532 A1 | 1/2016 |

* cited by examiner

*Primary Examiner* — Lars A Olson
*Assistant Examiner* — Jovon E Hayes
(74) *Attorney, Agent, or Firm* — Berenato & White, LLC

(57) ABSTRACT

An electric actuator for imparting steering movement to a propulsion unit of a marine vessel includes a housing and an output shaft reciprocatingly received by the housing. There is a motor disposed within the housing. The motor has a rotor assembly and a stator. Rotation of the rotor assembly causes the output shaft to translate axially relative to the rotor assembly and causes the output shaft to reciprocate relative to the housing. There is a coupling assembly mounted to the housing. The coupling assembly coupling the electric actuator to the propulsion unit of the marine vessel. There is a steering control unit mounted to the housing. The steering control unit drives the motor to cause the rotor assembly to rotate and the output shaft to reciprocate relative to the housing.

37 Claims, 20 Drawing Sheets

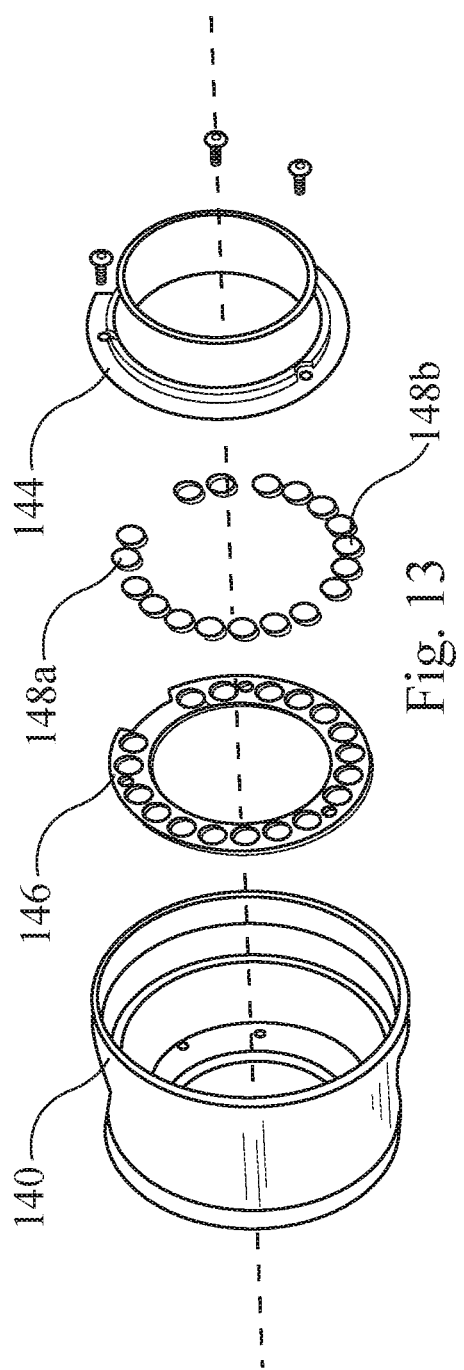

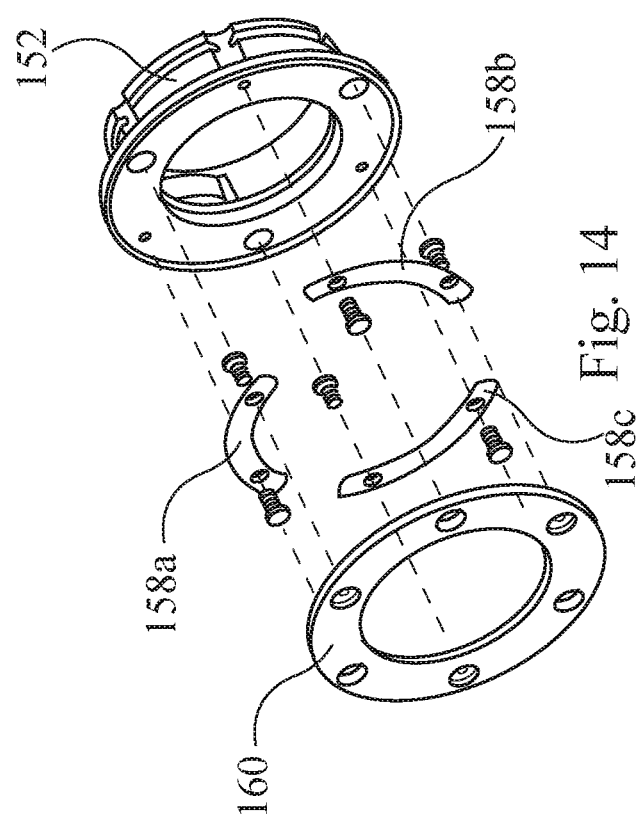

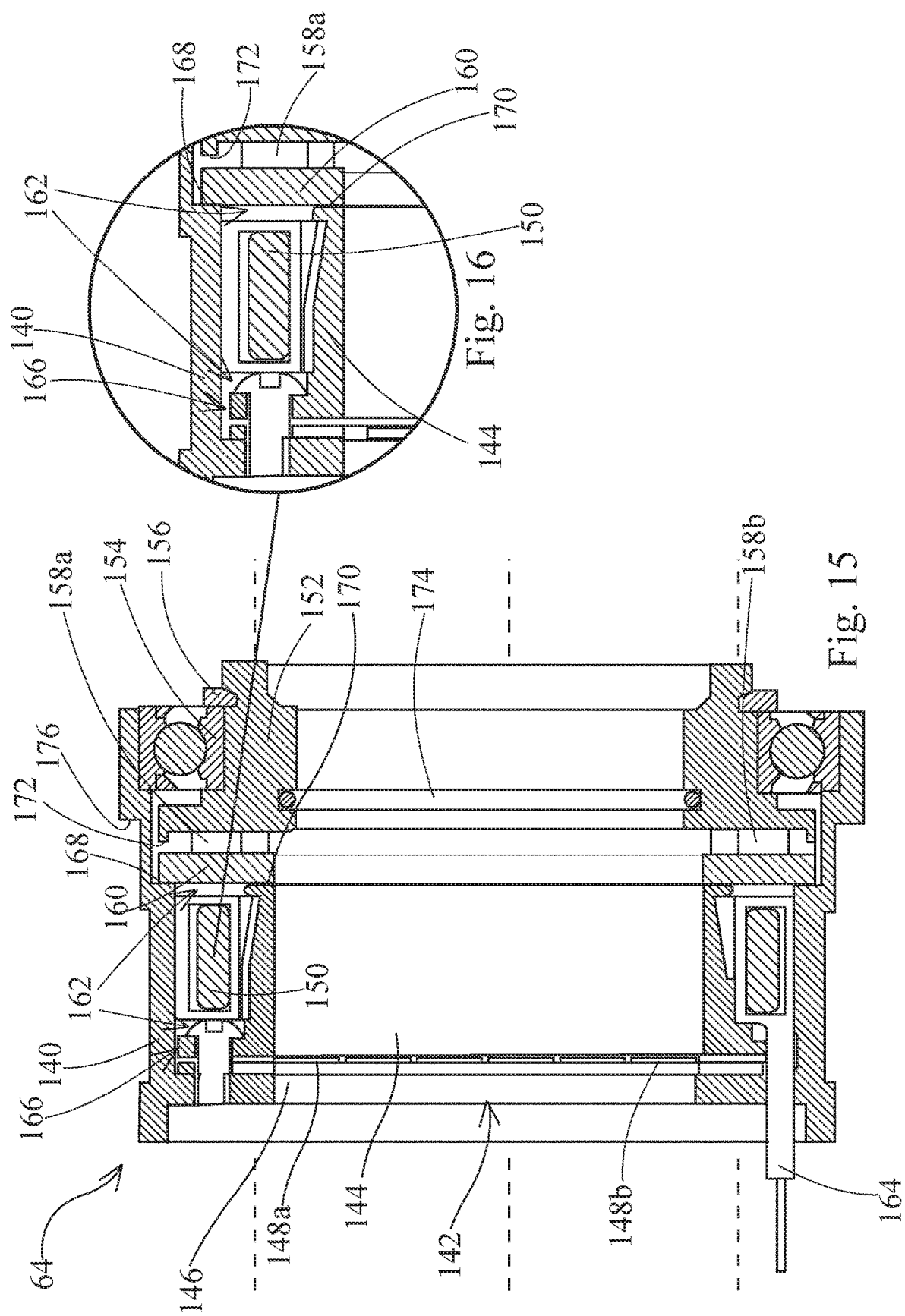

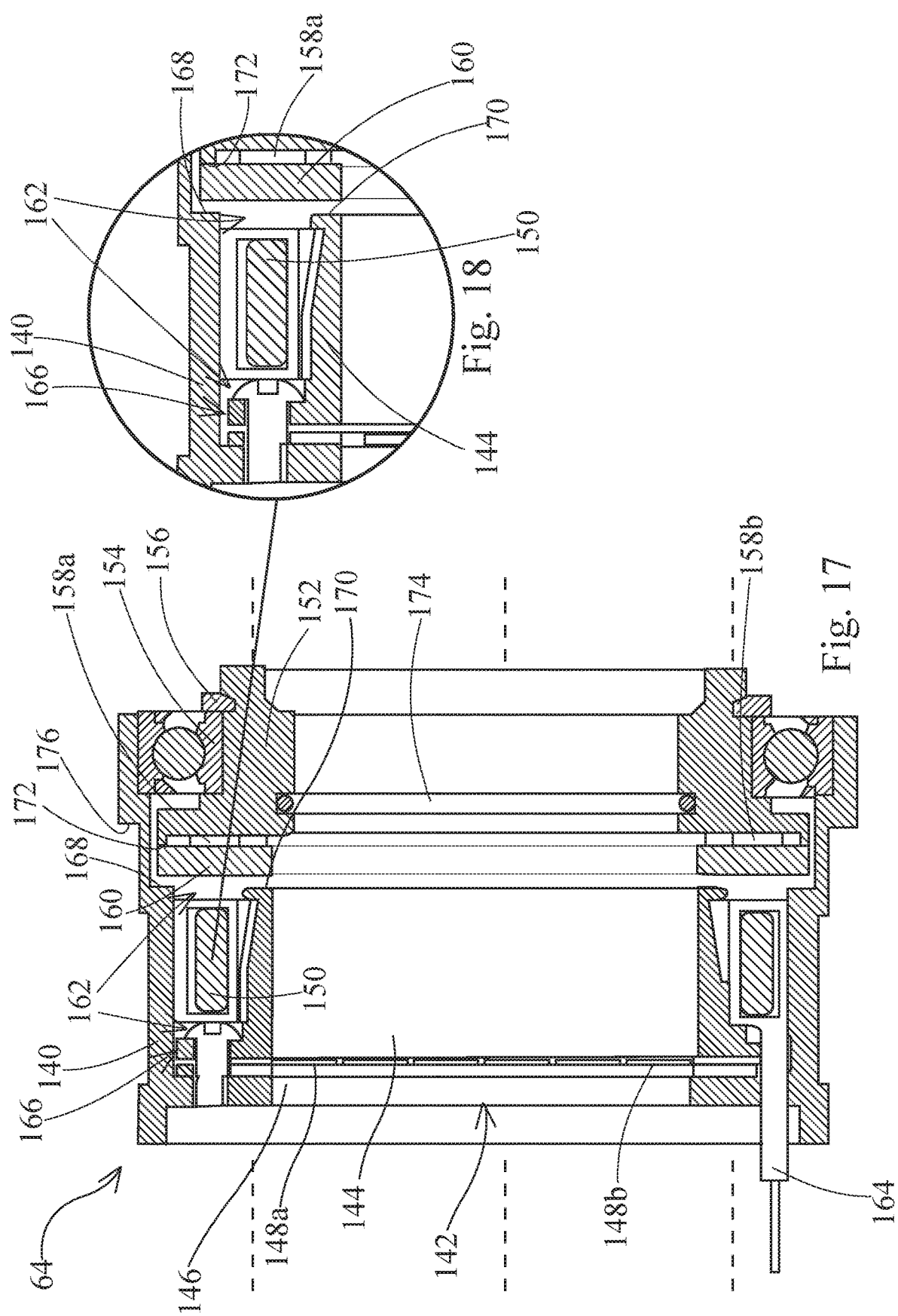

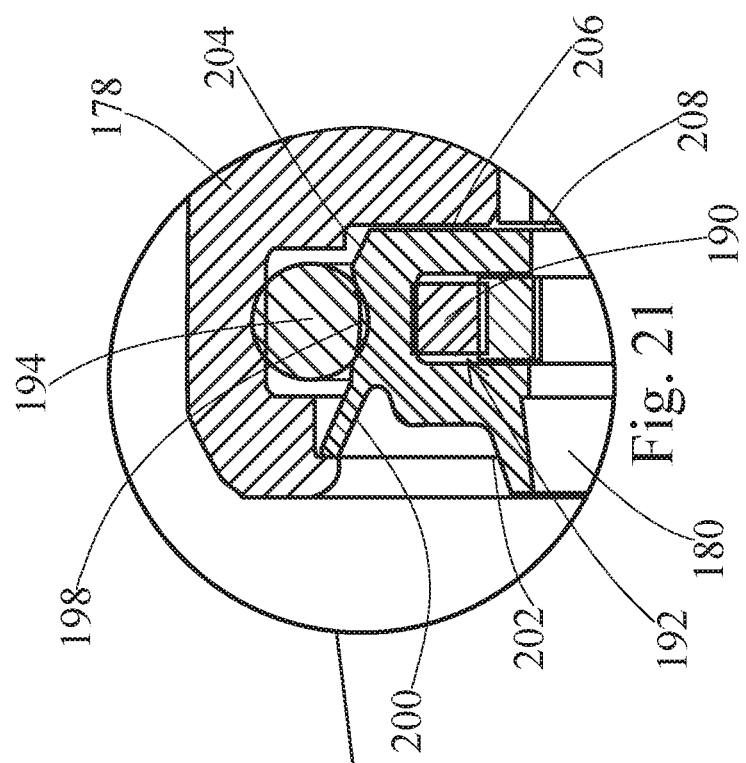
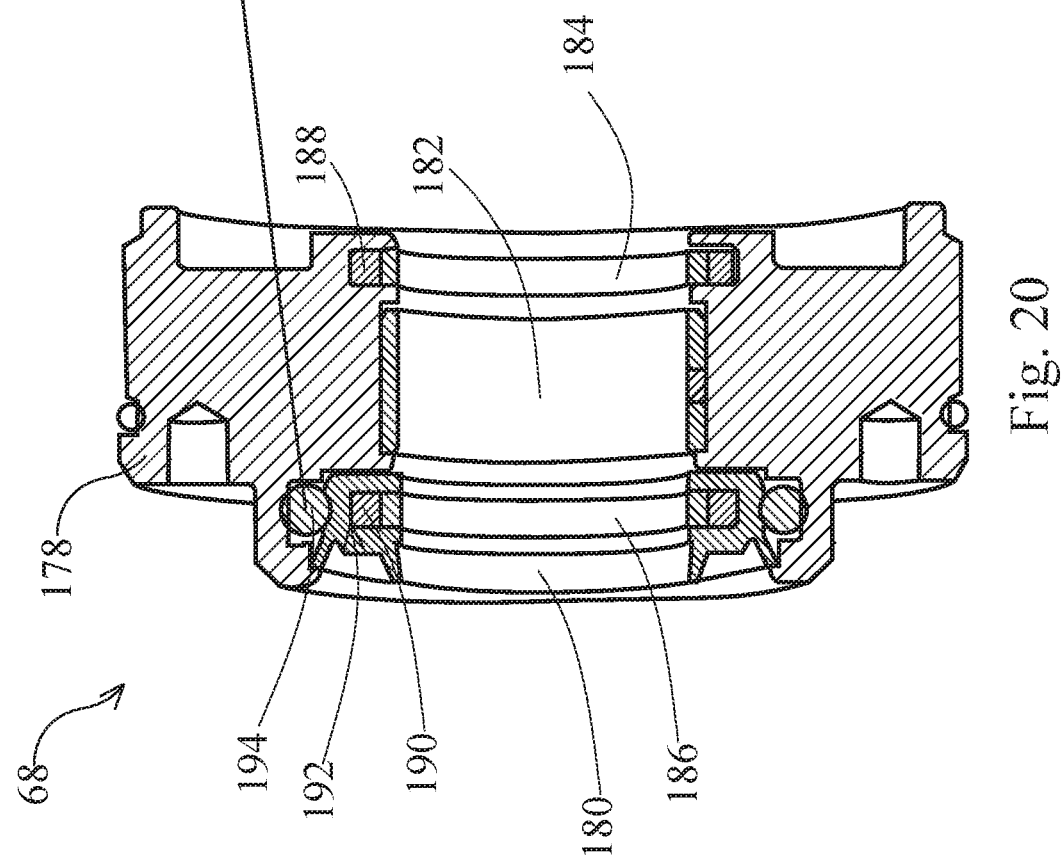

ELECTRIC ACTUATOR FOR A MARINE VESSEL

JOINT RESEARCH AGREEMENT

The invention was developed and the claimed invention was made by, or on behalf of, one or more parties to a joint research agreement that was in effect on or before the effective filing date of the claimed invention; the claimed invention was made as a result of activities undertaken within the scope of the joint research agreement; and the parties to the joint research agreement are Yamaha Motor Co., Ltd., Marine Acquisition Corp. and Marine Canada Acquisition Inc.

FIELD OF THE INVENTION

The present invention relates to an electric actuator and, in particular, to an electric actuator for a marine steering system for steering a marine vessel.

BACKGROUND OF THE INVENTION

United States Patent Application Publication No. 2017/0106959 which was published on Apr. 20, 2017, in the name of Davidson et al., discloses an electric actuator comprising a housing and an output shaft reciprocatingly received by the housing. There is a screw assembly disposed within the housing and coupled to the output shaft. The screw assembly includes a plurality of annular rollers and a central screw received by the annular rollers. The annular rollers are rotatable about the central screw. There is a motor which includes a stator and a rotor. The rotor has an inner bore which engages the annular rollers. Rotation of the rotor causes the central screw to translate axially relative to the rotor and the output shaft to reciprocate relative to the housing.

SUMMARY OF THE INVENTION

It is an object of the present invention to provide an electric actuator for a marine steering system for steering a marine vessel.

There is accordingly provided an electric actuator for imparting steering movement to a propulsion unit of a marine vessel. The electric actuator includes a housing and an output shaft reciprocatingly received by the housing. There is a motor disposed within the housing. The motor has a rotor assembly and a stator. Rotation of the rotor assembly causes the output shaft to translate axially relative to the rotor assembly and causes the output shaft to reciprocate relative to the housing. There is a coupling assembly mounted to the housing. The coupling assembly may couple the electric actuator to the propulsion unit of the marine vessel. There is a steering control unit mounted to the housing. The steering control unit drives the motor to cause the rotor assembly to rotate and the output shaft to reciprocate relative to the housing.

The electric actuator may include an electrical connector which electrically connects the steering control unit to the stator. There may be an opening in the housing and the electrical connector may extend through the opening to electrically connect the steering control unit to the stator. An interior of the steering control unit may be sealed. The electrical connector may include a commutation sensor board which senses a position of the rotor assembly and a motor connection which provides power to the stator. The commutation sensor board may include three sets of sensors with each set of sensors having redundant and offset sensors. A first sensor of each set of sensors may be positioned for advanced timing of the stator in a first direction and a second sensor of each set of sensors may be positioned for advanced timing of the stator in a second direction. The first direction and the second direction may be opposite directions and may respectively correspond to opposite steering directions based on rotation of the rotor assembly.

The electric actuator may include a brake. The brake may include an electromagnetic circuit and a brake pad. The electromagnetic circuit may include a magnet and a coil assembly. The magnet may generate a magnetic field which pulls the brake pad to an engaged position. The brake pad may be actuated to a released position when the coil assembly is energized by an electric current. The brake pad may engage a first friction surface and a second friction surface. The first friction surface and the second friction surface may be annular and concentric. The coil assembly may be an annular coil assembly which is rotatable within the housing for alignment purposes. The brake may pad may be actuated to a released position when the coil assembly is energized by an electric current between a first threshold current and a second threshold current. There may be a magnetic retainer received within a body and there may be an air gap between the magnetic retainer and the body to set brake strength and current thresholds.

The electric actuator may include an end gland at each end of the housing. Each end gland may include an annular seal within a floating seal housing and each floating seal housing may be sealed by an O-ring. The floating seal housing may include a radial lip with a sharp edge which functions as a scraper to scrape debris from the output shaft. The floating seal housing may include a heel which is concentric with the output shaft and the heel moves radially with the output shaft as the heel is side loaded.

BRIEF DESCRIPTIONS OF DRAWINGS

The invention will be more readily understood from the following description of the embodiments thereof given, by way of example only, with reference to the accompanying drawings, in which:

The invention will be more readily understood from the following description of the embodiments thereof given, by way of example only, with reference to the accompanying drawings, in which:

FIG. 13 is a fragmentary, exploded perspective view of the brake of the electric actuator of FIGS. 2 and 3;

FIG. 14 is another fragmentary, exploded perspective view of the brake of the electric actuator of FIGS. 2 and 3;

FIG. 15 is a partially sectional, elevation view of the brake for the electric actuator of FIGS. 2 and 3 in an engaged position;

FIG. 16 is an enlarged view of an air gap of the brake taken from FIG. 15;

FIG. 17 is a partially sectional, elevation view of the brake for the electric actuator of FIGS. 2 and 3 in a released position;

FIG. 18 is an enlarged view of the air gap of the brake taken from FIG. 17;

FIG. 20 is a partially sectional, elevation view of the end gland for the electric actuator of FIGS. 2 and 3;

FIG. 21 is an enlarged view of a portion of a floating seal housing of the end gland taken from FIG. 20.

DESCRIPTIONS OF THE PREFERRED EMBODIMENT(S)

Figure 1:
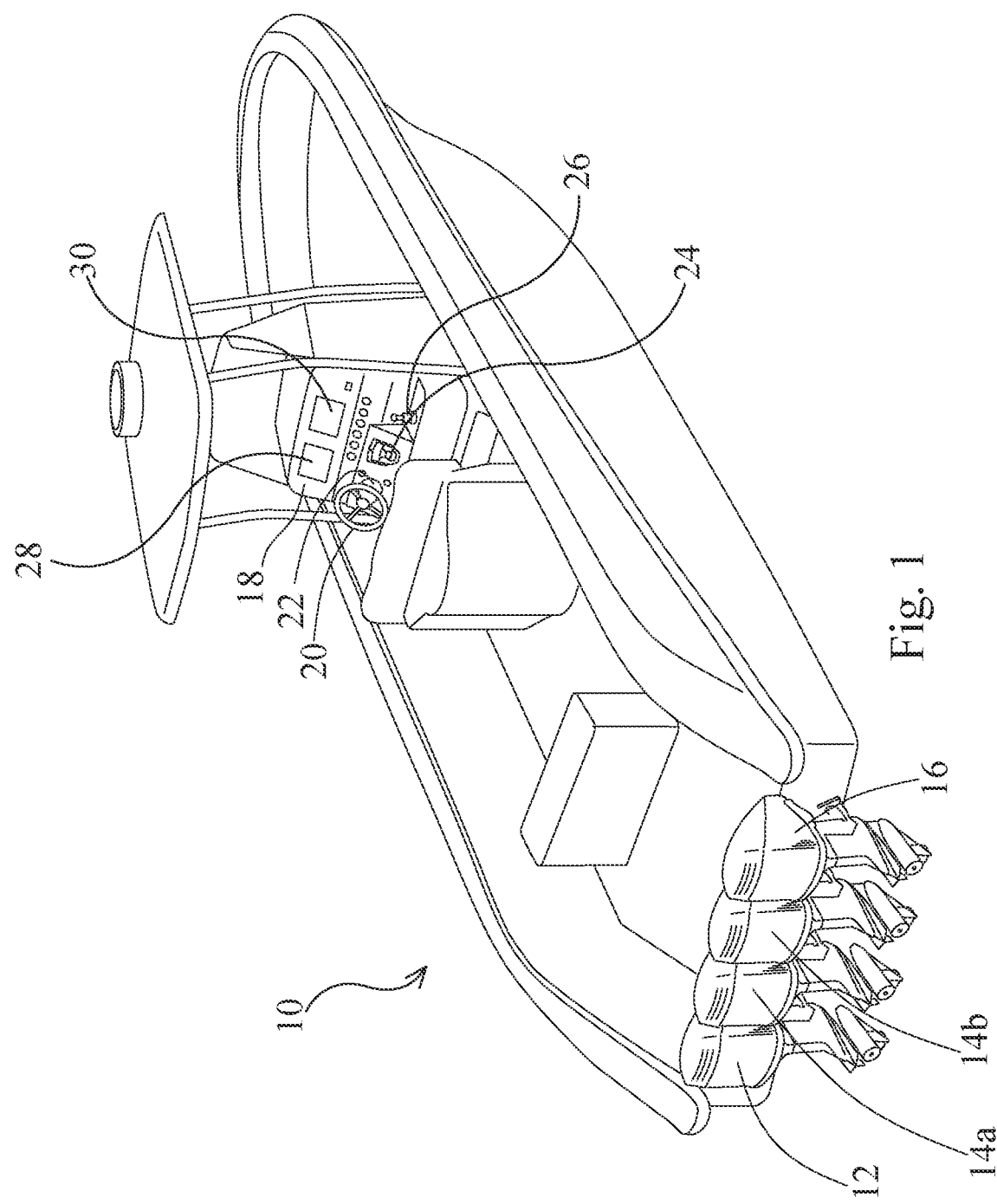
FIG. 1 is a perspective view of a marine vessel provided with a plurality of propulsion units each having an electric actuator.

Referring to the drawings and first to FIG. 1, there is shown a marine vessel 10 which is provided with a plurality of propulsion units which, in this example, are in the form of four outboard engines, namely, a port engine 12, a port center engine 14a, a starboard center engine 14b, and a starboard engine 16. However, the propulsion units may be any number or form of propulsion units in other examples. The marine vessel 10 is also provided with a control station 18 that supports a steering wheel 20 mounted on a helm 22, a control head 24, and a joystick 26. The control station 18 is conventional and allows the port engine 12, the port center engine 14a, the starboard center engine 14b, and the starboard engine 16 to be steered using either the steering wheel 20 and the helm 22 or the joystick 26 as disclosed in PCT International Application Publication Number WO 2013/1123208 A1 which is incorporated herein by reference. The control station 18 further includes a first display interface 28 and a second display interface 30. In this example, the first display interface is a display interface which displays navigational information and the second display interface is a display interface which displays onboard system information.

Figure 2:
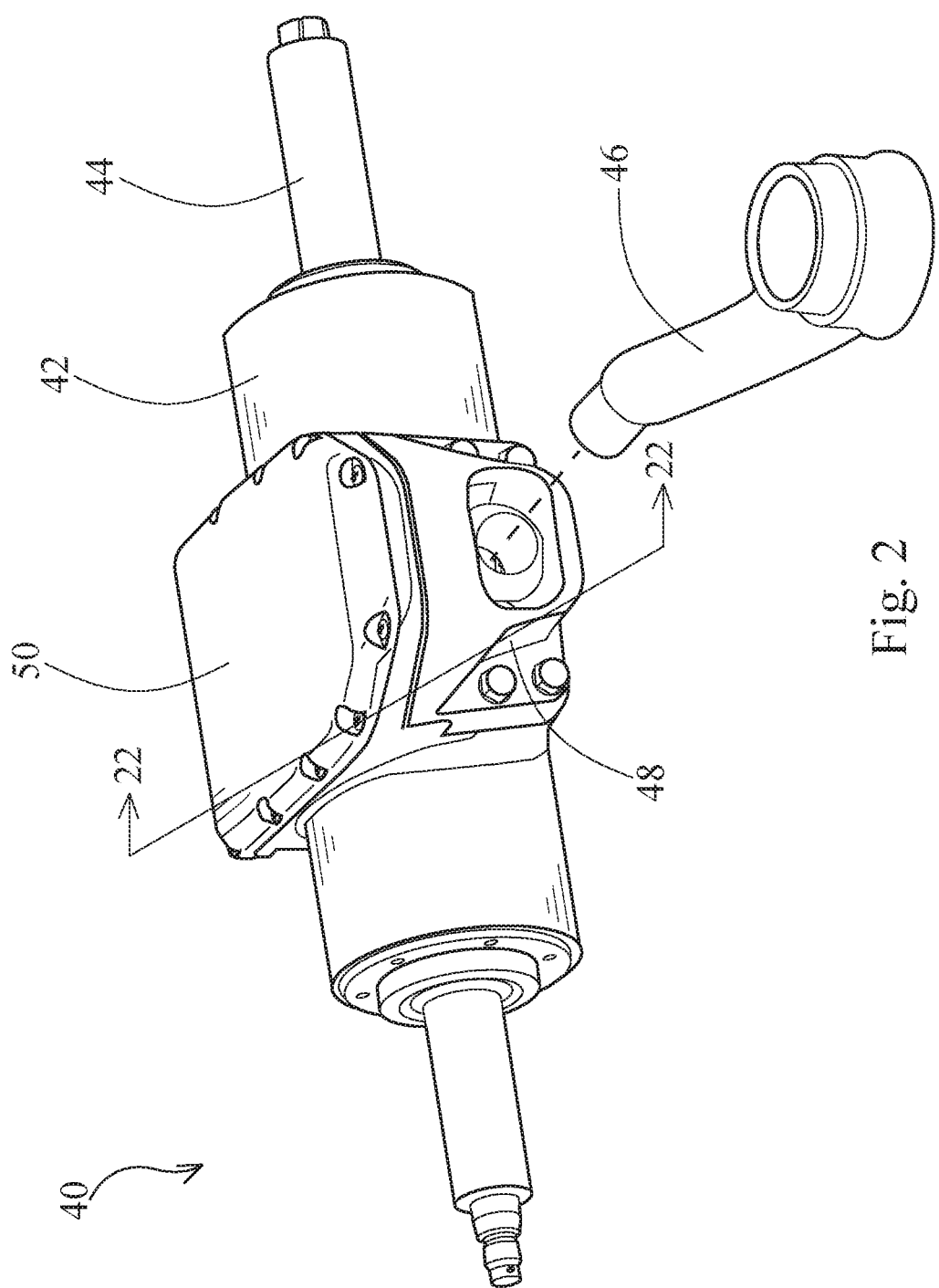
FIG. 2 is a perspective view of a first side of an electric actuator of one of the propulsion units of FIG. 1.
Figure 3:
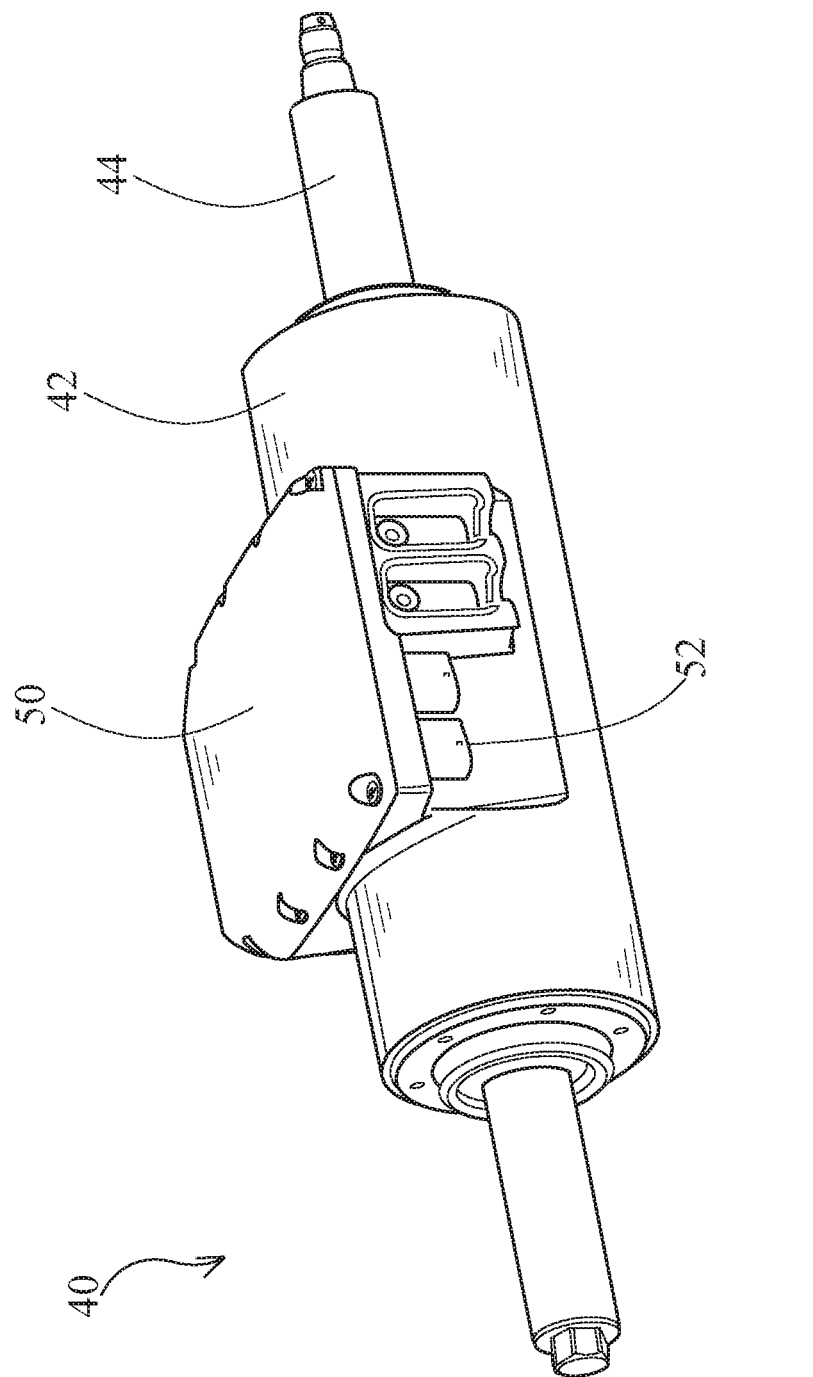
FIG. 3 is a perspective view of a second side of the electric actuator of one of the propulsion units of FIG. 1.

Each of the port engine 12, the port center engine 14a, the starboard center engine 14b, and the starboard engine 16 is provided with an electric actuator which steers each engine. FIGS. 2 and 3 show an electric actuator 40 of the port engine 12. It will be understood by a person skilled in the art that the electric actuators for the port center engine 14a, the starboard center engine 14b, and the starboard engine 16 are substantially identical in structure and function to the electric actuator 40 for the port engine 12. The electric actuators for the port center engine 14a, the starboard center engine 14b, and the starboard engine 16 are accordingly not described in detail herein. The electric actuator 40 includes a housing 42 as well as an output shaft 44 which is reciprocatingly received by the housing 42. It will be understood by a person skilled in the art that, when the electric actuator 40 is mounted on the port engine 12, axial movement of the output shaft 44 is inhibited relative to the marine vessel 10 while the housing 42 reciprocates linearly along the output shaft 44 and relative to the marine vessel 10. This relative linear movement of the housing 42 imparts a steering force to a tiller 46 of the port engine 12 and thereby causes the port engine 12 to be steering in a conventional manner.

There is a coupling assembly 48 mounted on the housing 42. The coupling assembly 48 is a ball joint assembly, in this example, and allows the housing 42 to be coupled to the tiller 46 of the port engine 12. There is also a steering control unit 50 mounted on the housing 42. The steering control unit 50 is accordingly integral with the electric actuator 40 as opposed to being elsewhere on the marine vessel 10 as is conventional. There are inputs, for example input 52, which allow the steering control unit 50 to be in communication with the control station of the marine vessel 10. Making the steering control unit 50 integral with the electric actuator 40 simplifies wiring, by eliminating the need for a number of wires/harnesses required in conventional systems, and reduces voltage drop between the steering control unit and the actuator.

Figure 4:
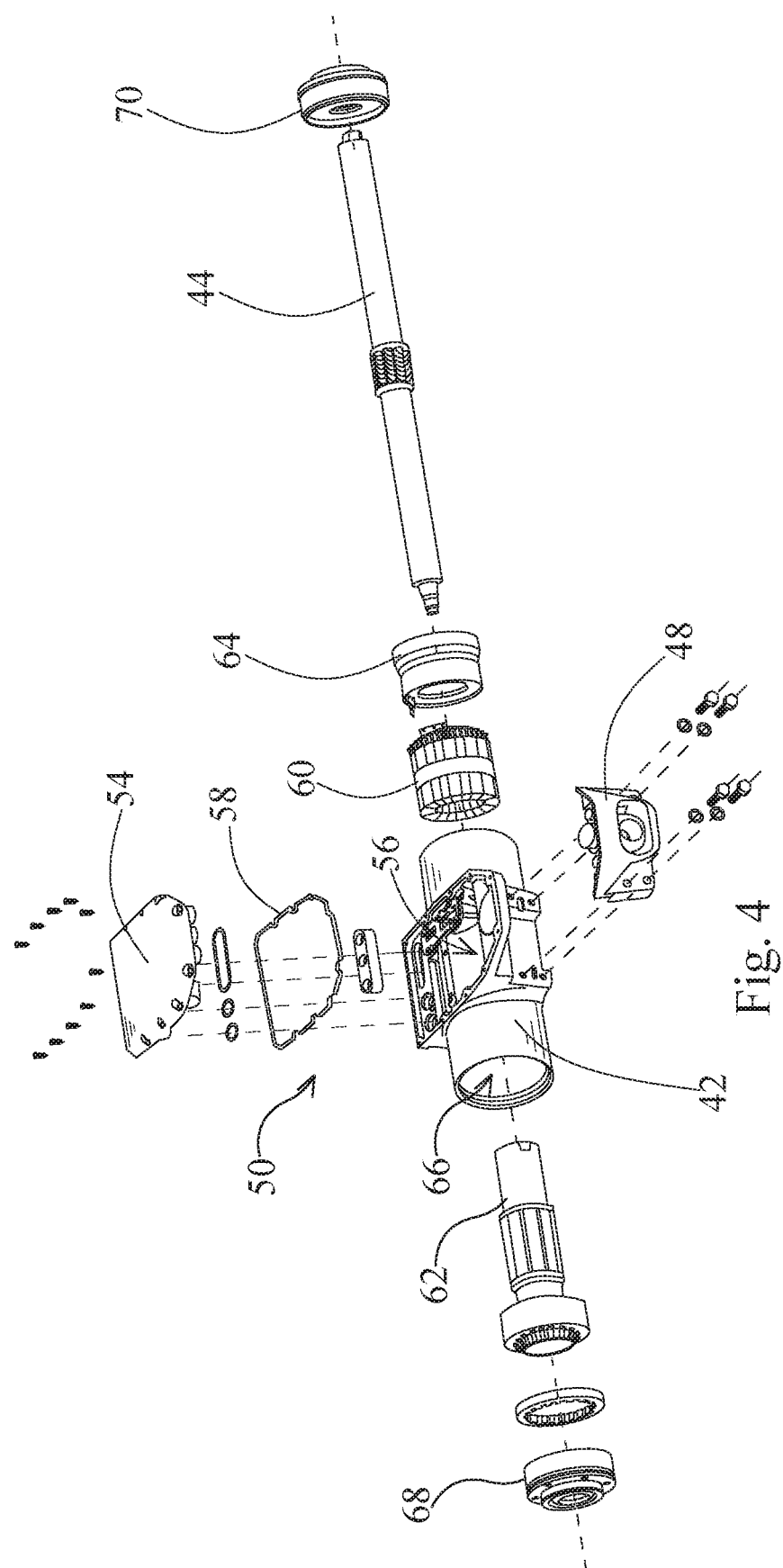
FIG. 4 is an exploded, perspective view of the electric actuator of FIGS. 2 and 3.
Figure 5:
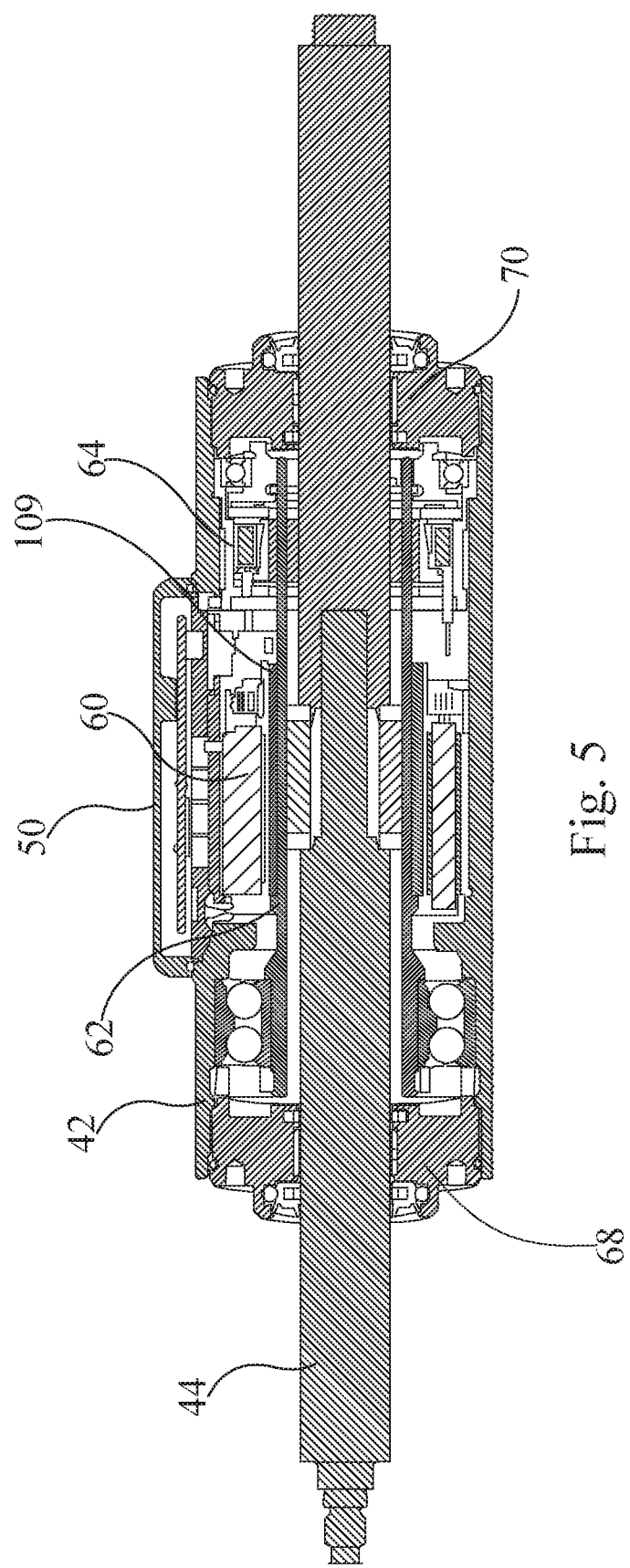
FIG. 5 is a longitudinal, sectional view of the electric actuator of FIGS. 2 and 3.
Figure 6:
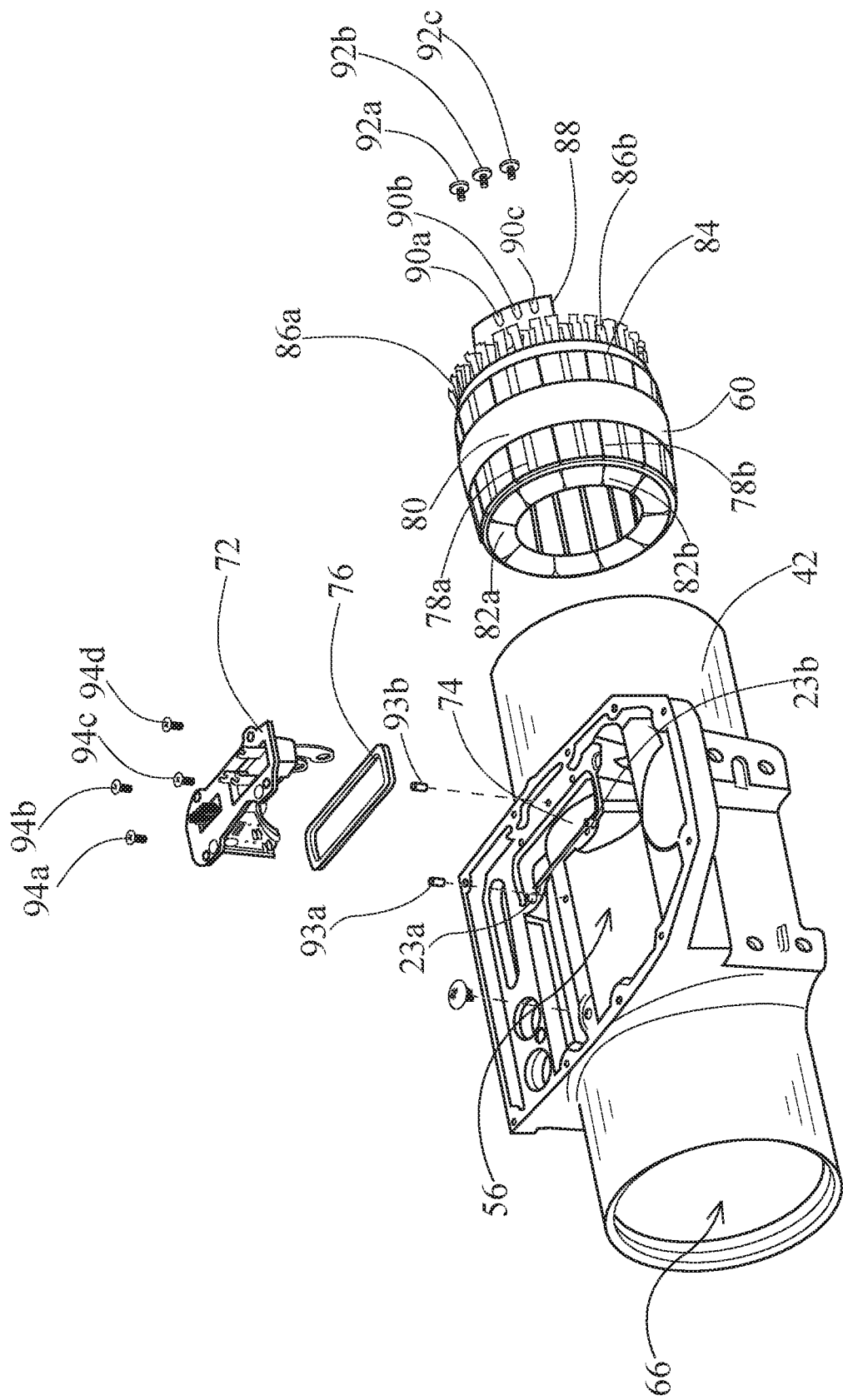
FIG. 6 is a fragmentary and exploded, perspective view of the electric actuator of FIGS. 2 and 3.

FIG. 4 is an exploded view of the electric actuator 40 and shows a cover 54 of the steering control unit 50 which covers electrical components within an interior 56 of the steering control unit 50 which is integral with the actuator housing 42 in this example. A gasket 58 is employed between the cover 54 and the interior 56 of the steering control unit 50 to seal the steering control unit 50 and the actuator housing 42. The electric actuator 40 further includes the following general components, namely, a stator 60, a rotor assembly 62, and a brake 64 which are disposed within an interior 66 of the housing 42 as best shown in FIG. 5. The housing 42 is sealed at opposite ends by an end gland 68 and an end gland 70. The electrical components of the steering control unit 50 are generally separated from the components disposed within the housing 42. However, with reference to FIG. 6, an electrical connector 72 extends through an opening 74 in the housing 42 to electrically connect the stator 60 to the steering control unit 50. A gasket 76 is employed about the electrical connector 72.

Figure 7:
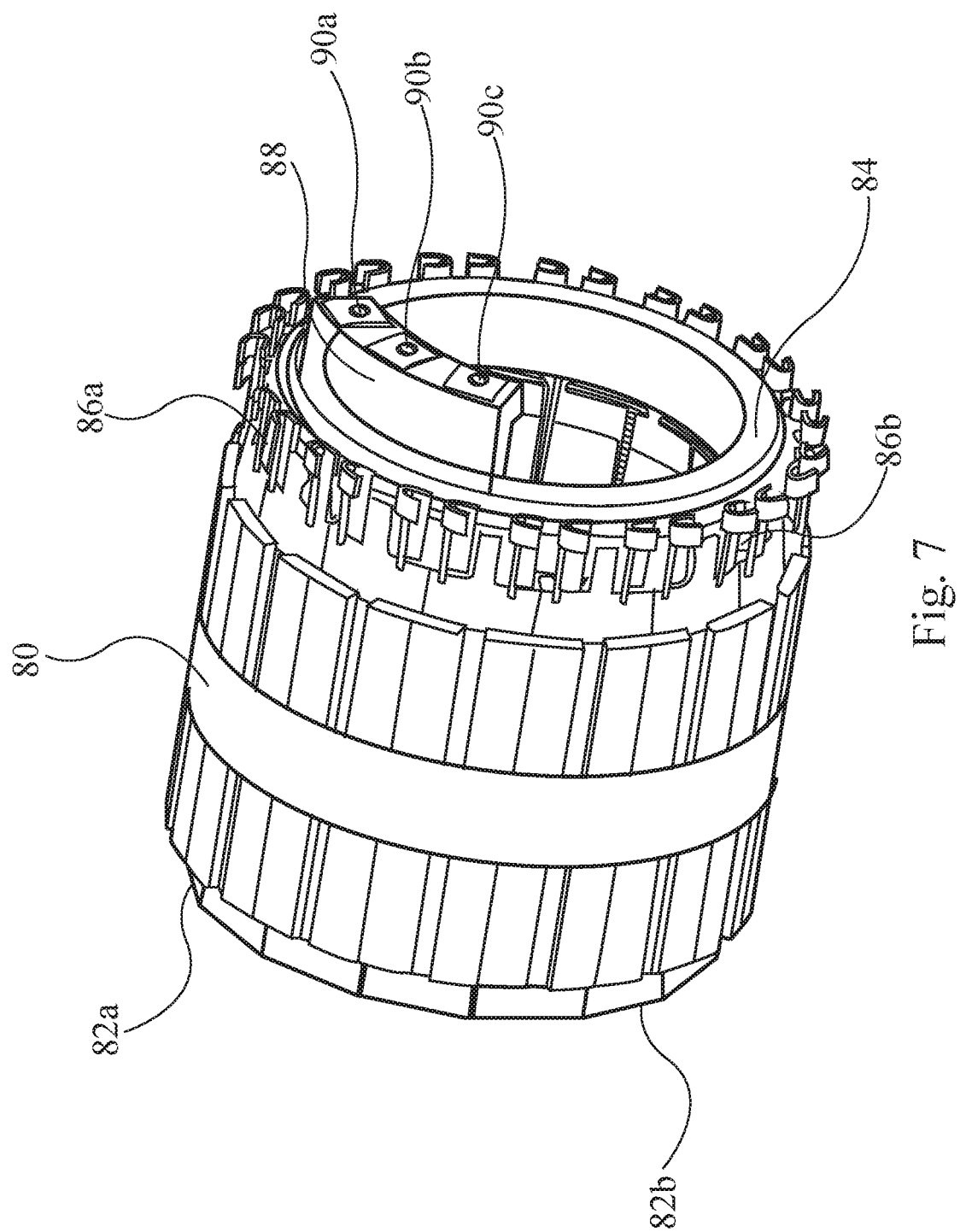
FIG. 7 is a perspective view of a stator of the electric actuator of FIGS. 2 and 3.

The stator 60 includes a plurality of segments, for example segments 78a and 78b, which are arranged in a generally annular formation and, in this example, are initially retained in the generally annular formation by a retaining ring 80. The segments 78a and 78b are received by the housing 42 and the retaining ring 80 is removed. The segments may then be retained in the generally annular formation in the housing 42 by potting about the stator with epoxy (not shown). The epoxy is sealed within the interior 66 of the housing 42 by the gasket 76. The segments may initially be arranged in the generally annular formation with play to allow the stator 60 to adjust to different sized housings. Each of the segments has a separate electrical winding coil, for example, coils 82a and 82b which are shown respectively for segments 78a and 78b. This arrangement allows for reduced end turns. The stator 60 also includes a lead frame 84, best shown in FIG. 7, with a plurality of openings, for example openings 86a and 86b, through which respective coils 82a and 82b are crimped and wired to the steering control unit 50 by the electrical connector 72. The lead frame 84 of the stator 60 also includes a portion 88 with a plurality of openings 90a, 90b, and 90c, shown in FIG. 7, which receive respective fasteners 92a, 92b, and 92c to allow for alignment and connection of the stator 60 with the electrical connector 72. The electrical connector 72 receives dowel pins 93a and 93b which allow for alignment of the stator 60 with the electrical connector 72. The electrical connector 72 also receives a plurality of fasteners 94a, 94b, 94c and 94d which hold the electrical connector in place. This arrangement separates electrical components within the interior 56 of the steering control unit 50 from the components within the interior 66 of the housing 42.

Figure 8A:
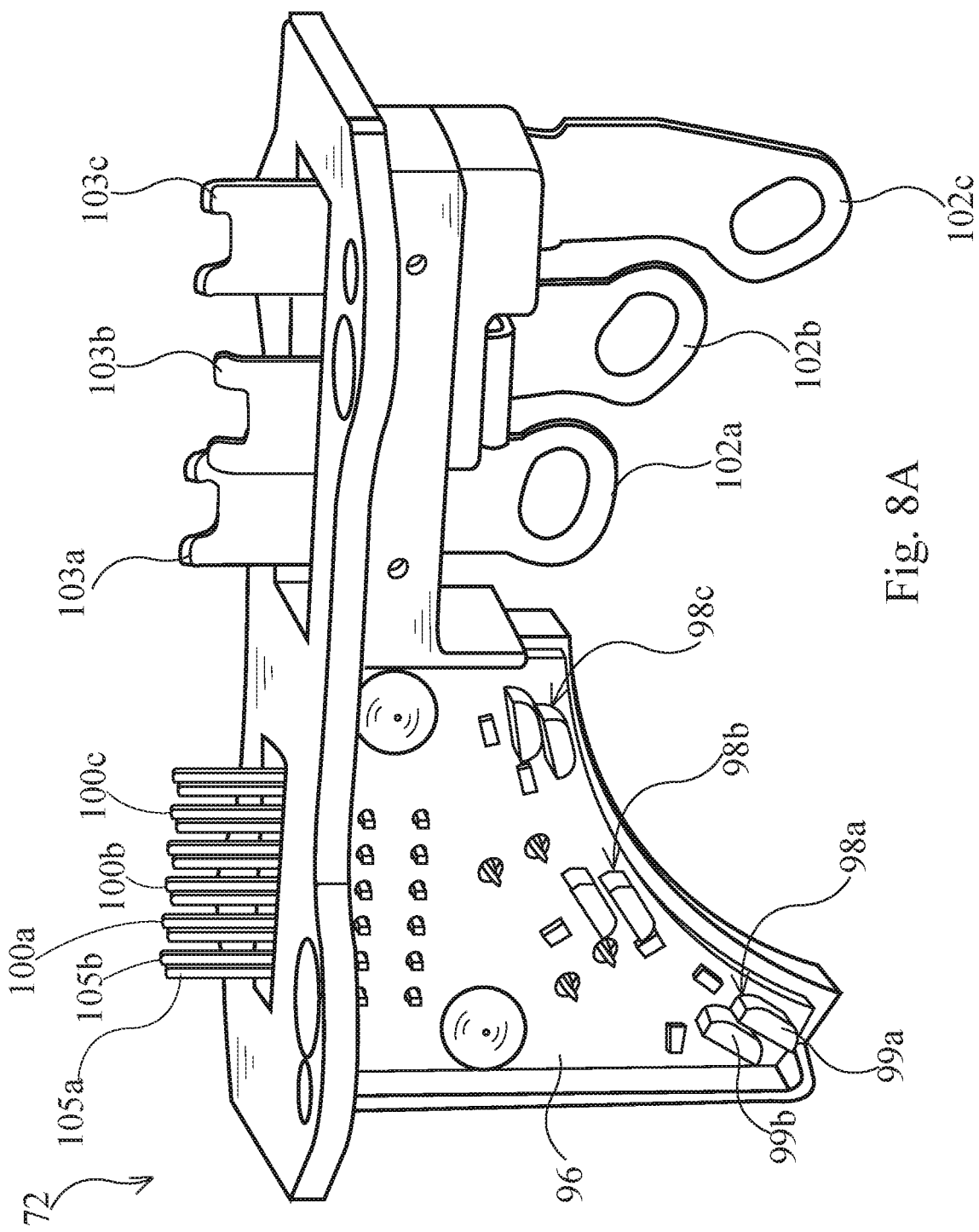
FIG. 8A is a perspective view of an electrical connector of the electric actuator of FIGS. 2 and 3.
Figure 8B:
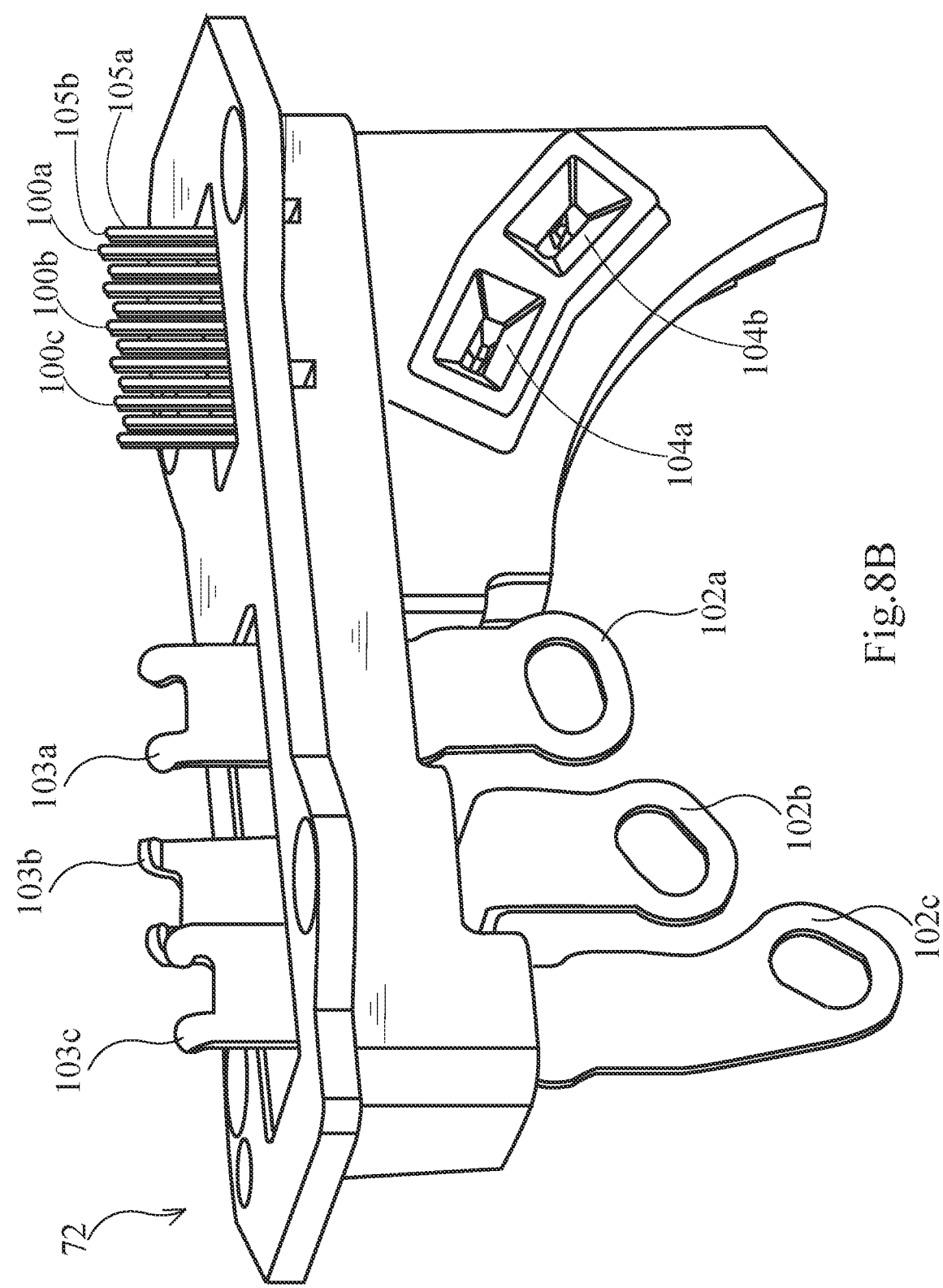
FIG. 8B is another perspective view of an electrical connector of the electric actuator of FIGS. 2 and 3.

The electrical connector 72 is shown in greater detail in FIGS. 8A and 8B. The electrical connector 72 has a commutation sensor board with sensors which, in this example, is a Hall Effect sensor board 96 with an array of Hall Effect sensors. There are three sets of Hall Effect sensors 98a, 98b, and 98c, in this example, because the electric actuator 40 has a three-phase electric motor. Alternating current fluctuates according to a curve from a positive to negative state over time. Each component of the three-phase current follows the same pattern but are spaced apart timewise. Each current phase uses all three sets of Hall Effect sensors. Each set of Hall Effect sensors 98a, 98b, and 98c is coupled to a respective one of Hall Effect sensor connections 100a, 100b and 100c. The electric connector 72 also has a plurality of motor connections 102a, 102b and 102c and corresponding motor pins 103a, 103b, and 103c as well as a plurality of brake connections 104a and 104b and corresponding brake pins 105a and 105b.

Figure 9:
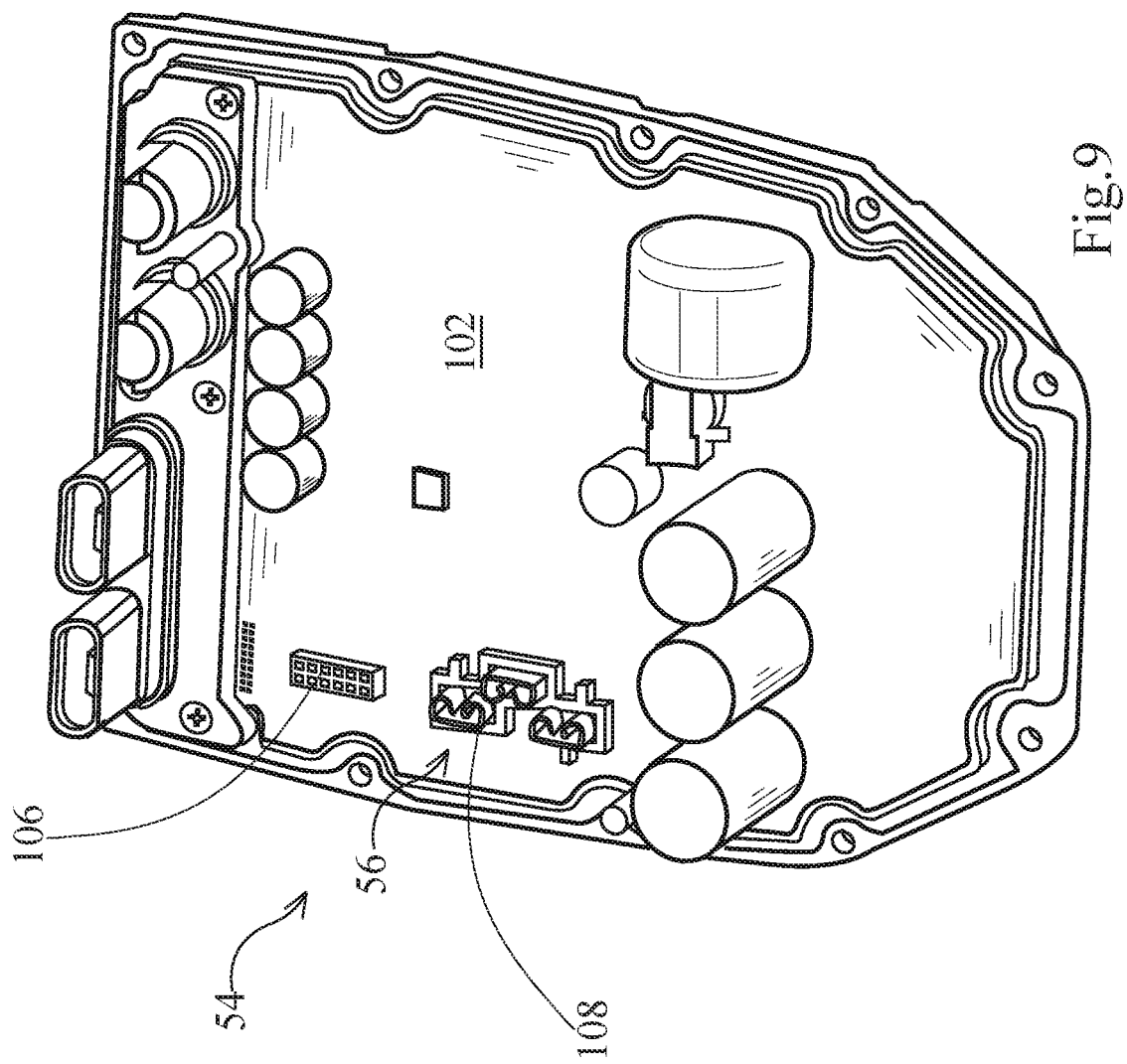
FIG. 9 is a plan view of an inside of a cover for a steering control unit of the electric actuator of FIGS. 2 and 3.
Figure 10:
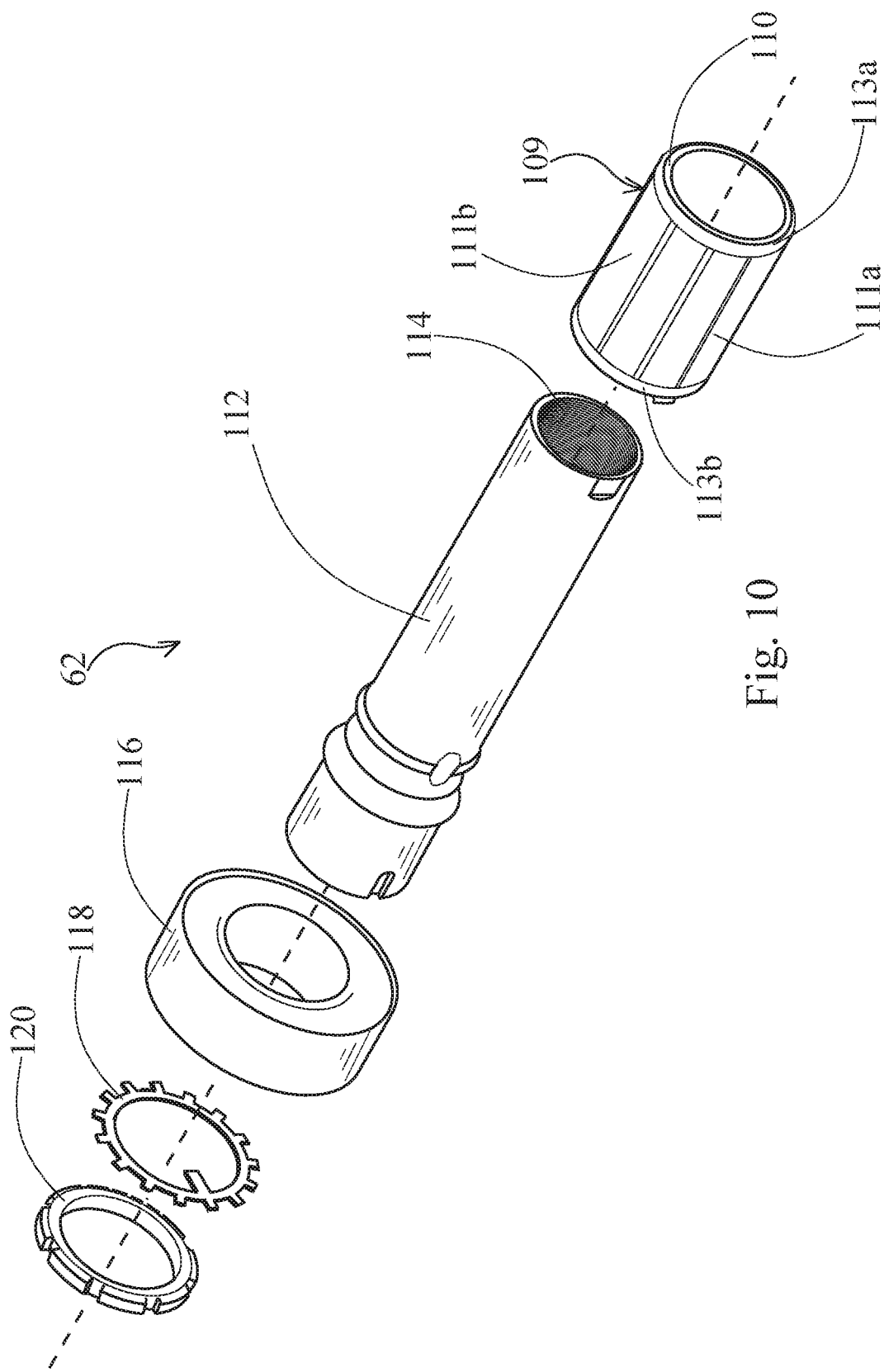
FIG. 10 is an exploded, perspective view of a rotor assembly for the electric actuator of FIGS. 2 and 3.

Referring now to FIG. 9, an inner side 102 of the cover 54 of the steering control unit 50 is provided with a first connection 106 and a second connection 108. The first connection 106 connects to the Hall Effect sensor connections 100a, 100b and 100c as well as the brake pins 105a and 105b. The second connection 108 connects to the motor connections 102a, 102b and 102c. The steering control unit 50 is thereby connected to the motor which includes the stator 60, the rotor assembly 62, and the Hall Effect sensor board 96. The rotor assembly 62 is best shown in FIG. 10 and includes a first rotor member 109 having a magnet sleeve 110 provided with a plurality of slots (not shown) which receive a plurality of magnets, for example magnets 111a and 111b, which are adhered to the magnet sleeve 110 in a generally annular formation. There are also retaining rings 113a and 113b that provide backup retention of the magnets 111a and 111b. The magnet sleeve 110 is mounted on a second rotor member 112 with an internally threaded bore 114. There is an angular contact bearing 116 that allows the rotor assembly 62 to rotate. There is also a lock washer 118 and a lock nut 120.

The Hall Effect sensor board 96 senses the relative position of the magnets 111a and 111b and is timed to the stator 60. The Hall Effect sensor board 96 is advanced timed in each direction. The stator 60 is accordingly powered by motor connections 102a, 102b and 102c such that the magnetic field generated is slightly in front of the rotational position of the magnets 111a and 111b and the magnetic field pulls the magnets 111a and 111b to rotate the rotor assembly 62. Each set of Hall Effect sensors 98a, 98b, and 98c on the Hall Effect sensor board 96, as called out for a first set of the Hall Effect sensors in FIG. 8A, has a first Hall Effect sensor 99a and a second redundant and offset Hall Effect sensor 99b. A first one of the Hall Effect sensors in each set of Hall Effect sensors 98a, 98b, and 98c is positioned for advanced timing in a first rotational direction and a second one of the Hall Effect sensors in each set of Hall Effect sensors 98a, 98b, and 98c is positioned for advanced timing in a second rotational direction. The first rotational direction and the second rotational direction are opposite and respectively correspond to opposite steering directions of the marine vessel 10 based on the rotation of the rotor assembly 62. The use of two different Hall Effect sensors in each set of Hall Effect sensors 98a, 98b, and 98c allows each set of Hall Effect sensors 98a, 98b, and 98c to "soak up" manufacturing tolerances while allowing advanced timing for the first rotational direction and the second rotational direction. Furthermore, if one of the Hall Effect sensors in any set of Hall Effect sensors 98a, 98b, and 98c fails then the other one of the Hall Effect sensors may function as a failsafe.

Figure 11:
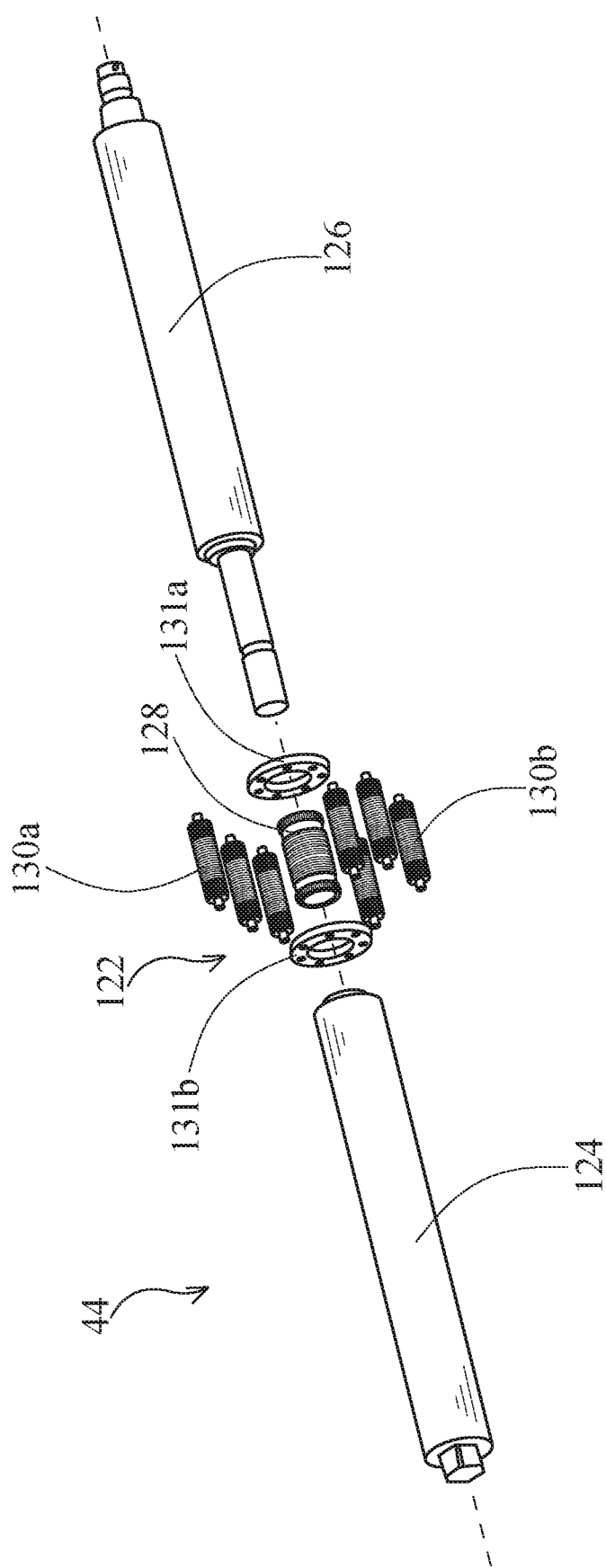
FIG. 11 is an exploded, perspective view of an output shaft for the electric actuator of FIGS. 2 and 3.

The rotor assembly 62, as shown in FIG. 5, receives the output shaft 44 which is shown in greater detail in FIG. 11 and, in this example, the output shaft 44 includes a roller screw assembly 122, a first shaft portion 124, and a second shaft portion 126. The roller screw assembly 122 has a central screw 128 and a plurality of rollers, for example, rollers 130a and 130b, which are able to rotate about the central screw in a planetary fashion but do not translate axially relative to the central screw 128. The rollers 130a and 130b are aligned by annular end plates 131a and 131b. The roller screw assembly 122 is received by the internally threaded bore 114 of the rotor assembly 62 which is shown in FIG. 10. Rotation of the rotor assembly 62 causes the output shaft 44, as shown in FIGS. 3 and 4, to reciprocate relative to the housing 42. When the electric actuator 40 is mounted on the port engine 12, axial movement of the output shaft 44 is inhibited relative to the marine vessel 10 while the housing 42 reciprocates linearly along the output shaft 44 and relative to the marine vessel 10. This relative linear movement of the housing 42 imparts a steering force to the tiller 46 of the port engine 12 and thereby causes the port engine 12 to be steered in a conventional manner. The output shaft 44 may also be rotated manually in an emergency by loosening a lock nut (not shown) which prevents rotation of the output shaft in normal operation.

Figure 12:
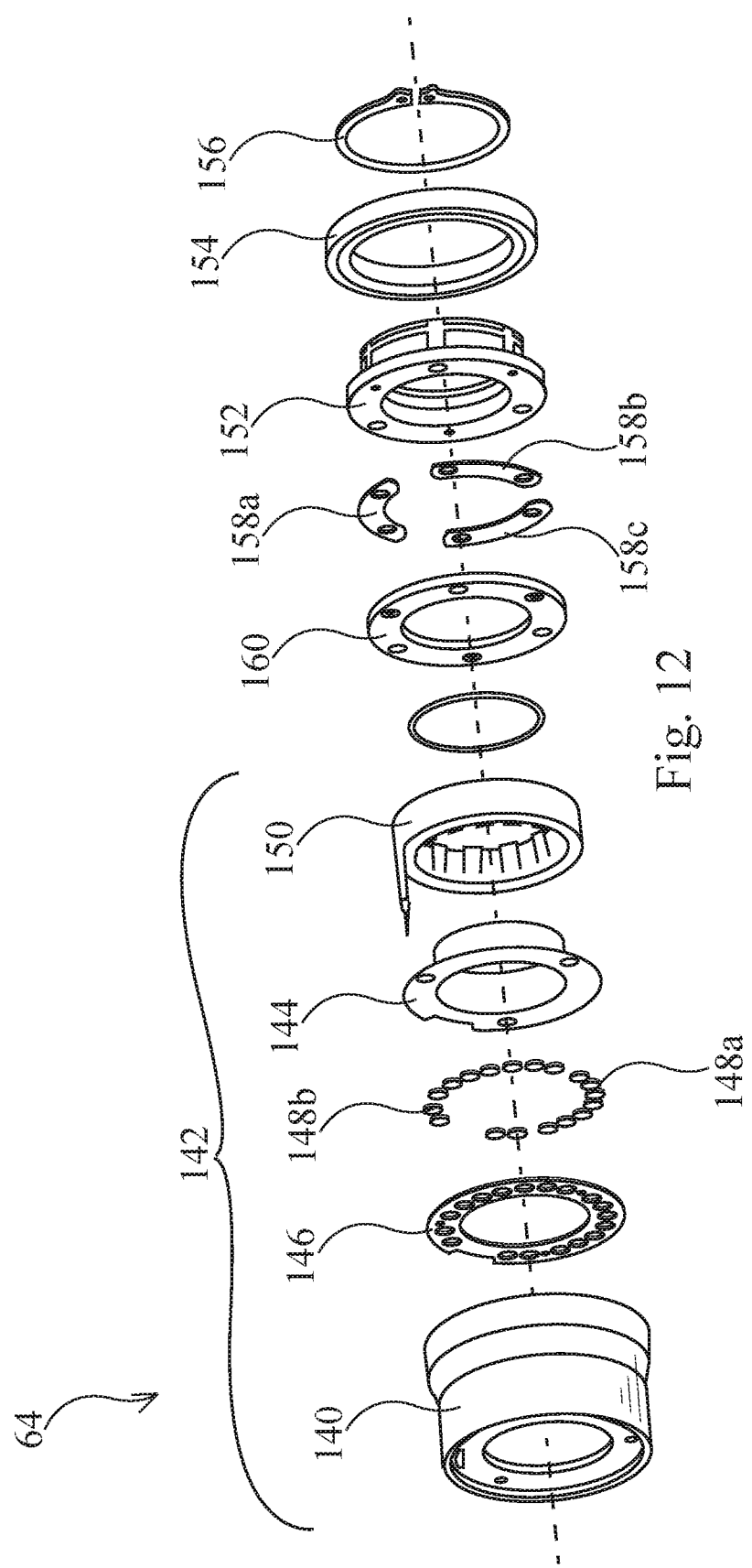
FIG. 12 is an exploded, perspective view of a brake for the electric actuator of FIGS. 2 and 3.

The brake 64 of the electric actuator 40 is shown in greater detail in FIG. 12. The brake 64 has an annular body 140 which houses an electromagnetic circuit 142. The electromagnetic circuit 142 includes a magnet retainer 144, a magnet holder 146 which holds a plurality of magnets, for example, permanent magnets 148a and 148b, and a brake coil assembly 150. The magnet retainer 144 retains the magnets and magnetic field. The magnet retainer 144, the magnet holder 146 and the permanent magnets 148a and 148b are shown in greater detail in FIG. 13. In other examples, there may be an annular magnetic ring. Referring back to FIG. 12, the brake 64 further includes a hub 152 which is press-fitted to a bearing 154. The bearing 154 is loose-fitted to the annular body 140. The bearing 154 holds the annular body 140 concentric to the hub 152. This allows the brake assembly 64 to align the rotor member 62 to the housing 42. The brake assembly 64 may be sub-assembled and tested as a module in production before integrating with the rotor member 62 and the housing 42. A retaining ring 156 acts as a backup retention. The bearing 154 allows the hub 152 to rotate with the rotor assembly 62. A plurality of flexures, for example arcuate flexures 158a, 158b, and 158c, are radially retained by and rotate with the hub 152. There is an annular brake pad 160 disposed between the electromagnet circuit 142 and the hub 152. The brake pad 160 is coupled to the hub 152 by the flexures 158a, 158b and 158c. The brake pad 160 therefore also rotates with the hub 152. The hub 152, the brake pad 160, and the flexures 158a, 158b, and 158c are shown in greater detail in FIG. 14.

FIGS. 15 and 16 show the coil assembly 150 disposed in an annular space or annulus 162 between the body 140 and the magnet retainer 144. The annulus 162 is larger in cross section than the coil assembly 150. This allows the coil assembly 150 to move within the annulus 162 so that a connector 164 of the coil assembly 150 may be aligned with the electrical connector 72 to connect with the brake connections 104a and 104b, shown in FIG. 8B, during assembly of the electric actuator 40. The movement of the coil assembly 150 within the annulus 162 may be rotary and/or radial movement. There is also an air gap 166 between the body 140 and the magnet retainer 144.

The permanent magnets 148a and 148b generate magnetic fields which pull the brake pad 160 to an engaged position against a first friction surface 168 and a second friction surface 170. In this example, the first friction surface 168 is a shoulder of the body 140 and the second friction surface 170 is an annular surface of the magnet retainer 144. The brake torque, or friction between the brake pad 160 and the first friction surface 168 and the second friction surface 170, is sufficient to prevent rotation of the hub 152 which is torsionally coupled to the rotor assembly 62. The brake 64 is accordingly normally in an engaged position, as shown in FIGS. 15 and 16, until the coil assembly 150 is energized to actuate the brake pad 160 to a released position.

FIGS. 17 and 18 show the brake 64 in the released position, when the coil assembly 150 is energized, and the coil assembly 150 generates a magnetic field which is sufficient to redirect the magnetic field generated by the permanent magnets 148a and 148b. This allows the flexures 158a, 158b, and 158c to bias the brake pad 160 away from the first friction surface 168 and the second friction surface 170 to the released position. There is a brake pad stop 172 which, in this example, is an annular lip of the hub 152 that restricts movement of the brake pad 160 away from the first friction surface 168 and the second friction surface 170 when the brake 64 is in the released position so the hub 152 can rotate freely. The brake pad stop 172 sets a maximum distance of the brake pad 160 from the first friction surface 168 and the second friction surface 170 when the brake 64 is in the released position. The maximum distance is set to allow the brake 64 to re-engage.

The coil assembly 150 is energized by receiving an electric current. However, in this example, the brake 64 is only actuated to the released position if a current supplied to the coil assembly 150 is between a first threshold current and a second threshold current. The first threshold current may be, for example, about 0.6 amps and the second threshold current may be about 1.2 amps, or the first threshold current may be about 0.8 amps and the second threshold current may be about 1.0 amps. This ensures consistent release of the brake 64 within the design limits of the current draw.

The air gap 166 between the body 140 and the magnet retainer 144 sets brake strength and current thresholds when the brake is in the released position. This minimizes the electric current required to move the brake to the released position while maintaining a desired minimum brake torque. The brake torque may be lower than an output torque of the motor of the electric actuator 40. This allows the motor of the electric actuator 40 to override the brake 64 in the event of brake failure. The brake torque may be greater than a back driving torque. This allows the brake 64 to restrict movement of the output shaft 44 in the event of motor failure. This also allows the brake to restrict movement of an engine mounted on a marine vessel which is important during trailering of the marine vessel.

The brake 64 may also be provided with an H-bridge in the steering control unit for reversing the polarity of the voltage supplied to the coil assembly 150. This increases the speed at which the brake 64 is actuated from the released position to the engaged position. This also increases the brake torque. There is an O-ring 174 which mates against the rotor assembly to provide rotational dampening. There is also a support ledge 176 on the body 140 of the brake 64 which minimizes thermal expansion of the brake 64.

Figure 19:
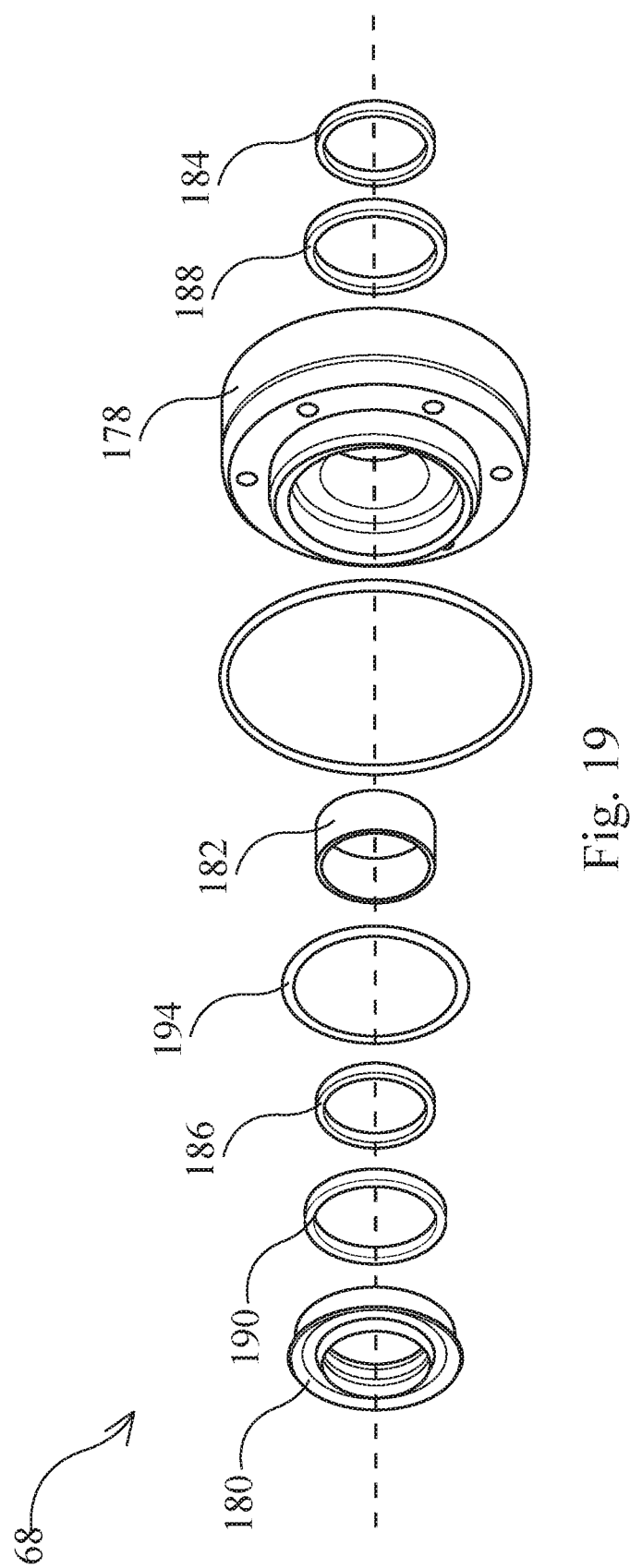
FIG. 19 is an exploded perspective view of an end gland for the electric actuator of FIGS. 2 and 3.

The end gland 68 is shown in greater detail in FIGS. 19 to 21. The end gland 68 includes an annular body 178. The annular body 178 receives a floating seal housing 180 and a bushing 182. The bushing 182 is disposed between an inner seal 184 and an outer seal 186. The inner seal 184 is provided with an inner seal energizer 188 and the outer seal 186 is provided with an outer seal energizer 190. The outer seal 186 and the outer seal energizer 190 are received by a groove 192 in the seal housing 180. There is a seal, in this example, an O-ring 194 disposed between the annular body 178 and the seal housing 180. The O-ring 194 sits on a concave wall 198 of the seal housing 180. This centers the O-ring 194 relative to the floating seal housing 184. The seal housing 180 is provided with a first radial lip 200 and a second radial lip 202. The first radial lip 200 is resilient and facilitates the installation of the seal housing 180 in the end gland 68. The second radial lip 202 has a sharp edge which functions as a scraper for scraping debris from the output shaft 44 and also provides stability and output shaft tracking. The sealing housing 180 is also provided with a chamfer 204 which facilitates the installation of the O-ring 194. A back wall 206 of the seal housing 180 is flush with the annular body 178 for stability. A back heel 208 of the seal housing 180 is concentric with the output shaft 44 and is formed of a rigid low wear material. The O-ring 194 allows the seal housing 180 to move radially when subjected to loads against the output shaft 44. This reduces wear of the second radial lip 202 and back heel 208 of the seal housing 180.

Figure 22:
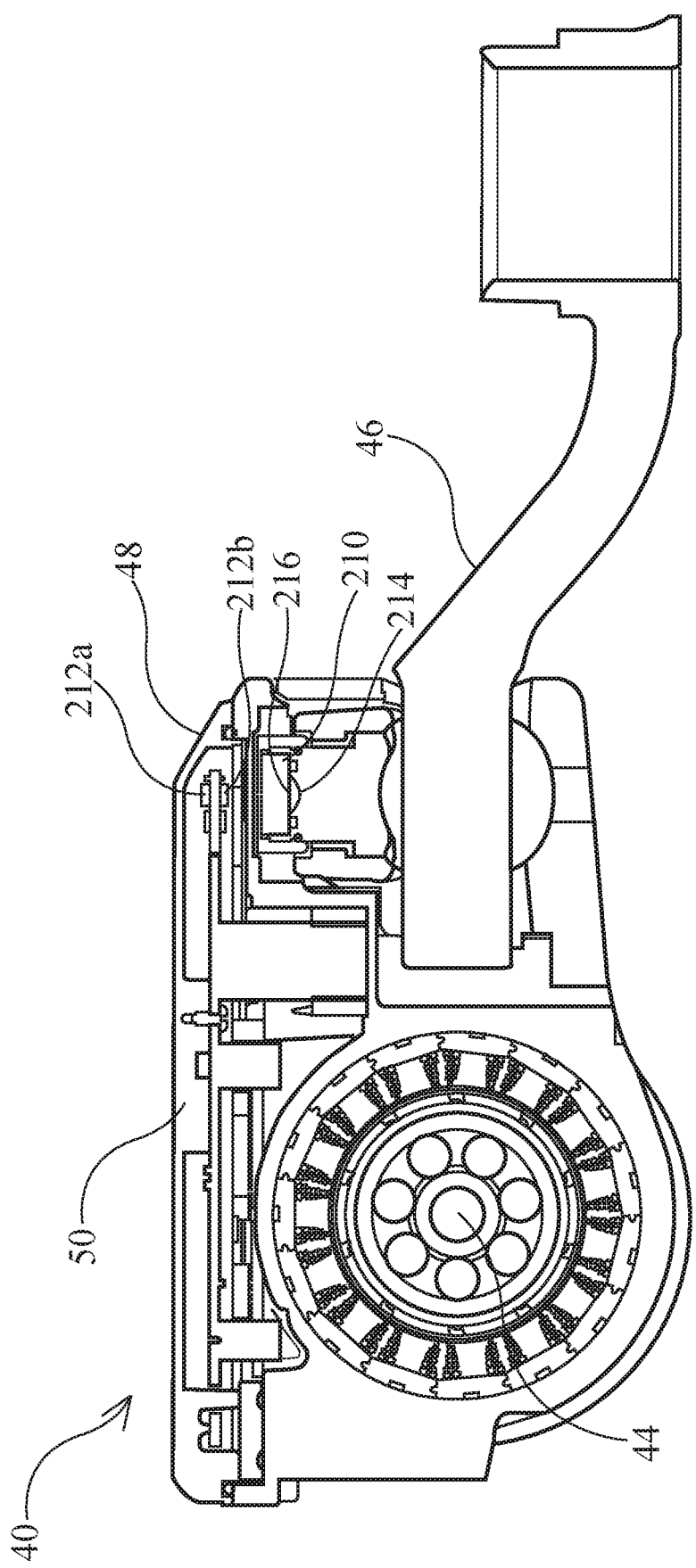
FIG. 22 is a cross-sectional view taken across line 22-22 of FIG. 2.

FIG. 22 shows the electric actuator 40 coupled to the tiller arm 46. There is a magnetic position target 210 mounted on the coupling assembly 48 and absolute position sensors 212a and 212b mounted on the electric actuator 40 within the steering control unit 50. The absolute position sensors 212a and 212b sense a steering position based on a position of the magnetic position target 210. The steering position may be referred to as the steering angle. The steering control unit 50 and the absolute position sensors 212a and 212b move axially relative to the output shaft 44 when steering motion is imparted to the tiller arm 46. The coupling assembly 48 and magnetic position target 210 rotate when steering motion is imparted to the tiller arm 46. The coupling assembly 48 has a curved surface 214 which drives a curved surface 216 of the magnetic position target 210. The curved surface 214 and the curved surface 216 allow a rotational degree of freedom in the direction of the output shaft 44 axis to handle potential rotational misalignment due to manufacturing tolerances and external loading.

It will be understood by a person skilled in the art that many of the details provided above are by way of example only, and are not intended to limit the scope of the invention, which is to be determined with reference to the following claims.

What is claimed is:

1. An electric actuator for imparting steering movement to a propulsion unit of a marine vessel, the electric actuator comprising:

a housing;

an output shaft reciprocatingly received by the housing;

a motor disposed within the housing, the motor including a rotor assembly and a stator, rotation of the rotor assembly causing the output shaft to translate axially relative to the rotor assembly and causing the output shaft to reciprocate relative to the housing;

a coupling assembly mounted to the housing, the coupling assembly coupling the electric actuator to the propulsion unit of the marine vessel; and a steering control unit mounted to the housing, the steering control unit driving the motor to cause the rotor assembly to rotate and cause the output shaft to reciprocate relative to the housing.

2. The electric actuator as claimed in claim 1 further including:

an electrical connector which electrically connects the steering control unit to the motor; and an opening in the housing, wherein the electrical connector extends through the opening to electrically connect the steering control unit to the stator and an interior of the steering control unit is sealed.

3. The electric actuator as claimed in claim 1 further including:

an electrical connector which electrically connects the steering control unit to the motor, the electrical connector including a commutation sensor board which senses a position of the rotor assembly and a motor connection which provides power to the stator; and an opening in the housing, wherein the electrical connector extends through the opening to electrically connect the steering control unit to the stator and an interior of the steering control unit is sealed.

4. The electric actuator as claimed in claim 3 wherein the commutation sensor board includes three sets of sensors with each set of sensors having redundant and offset sensors, wherein a first sensor of each set of sensors is positioned for advanced timing of the stator in a first direction and a second sensor of each set of sensors is positioned for advanced timing of the stator in a second direction, the first direction and the second direction are opposite and respectively correspond to opposite steering directions based on rotation of the rotor assembly.

5. The electric actuator as claimed in claim 1 further including a brake, the brake including:

an electromagnetic circuit having a magnet and a coil assembly; and a brake pad, wherein the magnet generates a magnetic field which pulls the brake pad to an engaged position, and the brake pad is actuated to a released position when the coil assembly is energized by an electric current.

6. The electric actuator as claimed in claim 5 wherein the brake pad engages a first friction surface and a second friction surface.

7. The electric actuator as claimed in claim 6 wherein the first friction surface and the second friction surface are annular and concentric.

8. The electric actuator as claimed in claim 5 wherein the coil assembly is an annular coil assembly.

9. The electric actuator as claimed in claim 8 wherein the coil assembly is rotatable.

10. The electric actuator as claimed in claim 5 wherein the brake pad is actuated to a released position when the coil assembly is energized by an electric current between a first threshold current and a second threshold current.

11. The electric actuator as claimed in claim 5 wherein further including a magnetic retainer received within a body and an air gap between the magnetic retainer and the body.

12. The electric actuator as claimed in claim 1 further including an end gland at each end of the housing, each said end gland including an annular seal within a floating seal housing.

13. The electric actuator are claimed in claim 12 wherein the floating seal housing itself is sealed.

14. The electric actuator as claimed in claim 12 wherein the floating seal housing includes a radial lip with a sharp edge which functions as a scraper to scrape debris from the output shaft.

15. The electric actuator as claimed in claim 12 wherein the floating seal housing includes a heel which is concentric with the output shaft and moves radially with the output shaft.

16. The electric actuator as claimed in claim 1 wherein the rotor assembly includes:

a first rotor member including a sleeve and a plurality of magnets arranged in an annular formation on the first rotor member; and a second rotor member have an threaded bore, wherein the first rotor member is mounted about the second rotor member.

17. The electric actuator as claimed in claim 1 wherein the stator includes a plurality of segments arranged in an annular formation and each segment having a separate coil.

18. The electric actuator as claimed in claim 17 wherein the segments are maintained in an annular formation in the housing with potting.

19. An electric actuator for imparting steering movement to a tiller of a propulsion unit of a marine vessel, the electric actuator comprising:

a housing;

an output shaft reciprocatingly received by the housing; and a motor disposed within the housing, the motor including a rotor assembly and a stator, rotation of the rotor assembly causing the output shaft to translate axially relative to the rotor assembly and causing the output shaft to reciprocate relative to the housing;

a coupling assembly mounted to the housing, the coupling assembly coupling the electric actuator to the tiller of the propulsion unit of the marine vessel;

a magnetic position target mounted on the coupling assembly; and a position sensor mounted on the actuator, the position sensor sensing a position of the electric actuator based on a position of the magnetic position target.

20. The electric actuator as claimed in claim 19 further including a commutation sensor board which senses a position of the rotor assembly.

21. The electric actuator as claimed in claim 20 wherein the commutation sensor board includes three sets of sensors with each set of sensors having redundant and offset sensors, wherein a first sensor of each set of sensors is positioned for advanced timing of the stator in a first direction and a second sensor of each set of sensors is positioned for advanced timing of the stator in a second direction, the first direction and the second direction are opposite and respectively correspond to opposite steering directions based on rotation of the rotor assembly.

22. The electric actuator as claimed in claim 19 further including a brake, the brake including:

an electromagnetic circuit having a magnet and a coil assembly; and a brake pad, wherein the magnet generates a magnetic field which pulls the brake pad to an engaged position, and the brake pad is actuated to a released position when the coil assembly is energized by an electric current.

23. The electric actuator as claimed in claim 22 wherein the brake pad engages a first friction surface and a second friction surface.

24. The electric actuator as claimed in claim 23 wherein the first friction surface and the second friction surface are annular and concentric.

25. The electric actuator as claimed in claim 22 wherein the coil assembly is an annular coil assembly.

26. The electric actuator as claimed in claim 25 wherein the coil assembly is rotatable.

27. The electric actuator as claimed in claim 22 wherein the brake is pad is actuated to a released position when the coil assembly is energized by an electric current between a first threshold current and a second threshold current.

28. The electric actuator as claimed in claim 22 wherein further including a magnetic retainer received within a body and an air gap between the magnetic retainer and the body.

29. The electric actuator as claimed in claim 19 further including an end gland at each end of the housing, each said end gland including an annular seal within a floating seal housing.

30. The electric actuator are claimed in claim 29 wherein the floating seal housing itself is sealed.

31. The electric actuator as claimed in claim 29 wherein the floating seal housing includes a radial lip with a sharp edge which functions as a scraper to scrape debris from the output shaft.

32. The electric actuator as claimed in claim 29 wherein the floating seal housing includes a heel which is concentric with the output shaft and moves radially with the output shaft.

33. The electric actuator as claimed in claim 19 wherein the rotor assembly includes:

a first rotor member including a sleeve and a plurality of magnets arranged in an annular formation on the first rotor member; and a second rotor member have an threaded bore, wherein the first rotor member is mounted about the second rotor member.

34. The electric actuator as claimed in claim 19 wherein the stator includes a plurality of segments arranged in an annular formation and each segment having a separate coil.

35. The electric actuator as claimed in claim 34 wherein the segments are maintained in an annular formation in the housing with potting.

36. The electric actuator as claimed in claim 34 wherein the coupling assembly has a curved surface and the magnetic position target has a curved surface which is driven by the curved surface of the coupling assembly when the coupling assembly rotates.

37. A marine steering system comprising:

a propulsion unit having a tiller; and an actuator for imparting steering movement to the tiller of the propulsion unit, the actuator including:

a housing;

an output shaft reciprocatingly received by the housing;

a motor disposed within the housing, the motor including a rotor assembly and a stator, rotation of the rotor assembly causing the output shaft to translate axially relative to the rotor assembly and causing the output shaft to reciprocate relative to the housing;

a coupling assembly mounted to the housing, the coupling assembly coupling the electric actuator to the propulsion unit of the marine vessel; and a steering control unit mounted to the housing, the steering control unit driving the motor to cause the rotor assembly to rotate and cause the output shaft to reciprocate relative to the housing.

* * * * *